361-72.2 S4
1/27/87 03 RE 32,342

United States Patent [19]

Wilder et al.

[11] E Patent Number: Re. 32,342

[45] Reissued Date of Patent: Jan. 27, 1987

[54] INSTRUCTION INDICATING APPARATUS FOR A RECORD AND/OR PLAYBACK DEVICE

[75] Inventors: Leslie N. Wilder; James C. Whitney, both of Fairfield; Gary G. Matison, Wilton, all of Conn.

[73] Assignee: Dictaphone Corporation, Rye, N.Y.

[21] Appl. No.: 629,314

[22] Filed: Jul. 26, 1984

Related U.S. Patent Documents

Reissue of:

[64] Patent No.: 4,051,540
Issued: Sep. 27, 1977
Appl. No.: 678,697
Filed: Apr. 20, 1976

U.S. Applications:

[63] Continuation of Ser. No. 79,171, Sep. 26, 1974, abandoned.

[51] Int. Cl.[4] ..... G11B 15/18
[52] U.S. Cl. ..... 360/72.2; 369/28
[58] Field of Search ..... 360/72.1-72.3, 360/137; 369/25-28

[56] References Cited

U.S. PATENT DOCUMENTS

| | | | |
|---|---|---|---|
| 2,161,273 | 6/1939 | Begun | 340/675 |
| 2,306,614 | 12/1942 | Calusen | 179/100.4 |
| 2,329,107 | 9/1943 | Clausen | 179/6 |
| 2,610,061 | 9/1952 | Kegan | 274/1 |
| 2,866,855 | 12/1958 | La Forest | 179/100.1 |
| 2,874,219 | 2/1959 | Cavanaugh | 179/6 |
| 3,171,902 | 3/1965 | Jones et al. | 360/74 |
| 3,203,000 | 8/1965 | Dollenmayer | 346/50 |
| 3,405,234 | 10/1968 | West | 178/66 |
| 3,470,777 | 10/1969 | Flubacker | 360/72 |
| 3,541,271 | 11/1970 | Joslow et al. | 360/72 |
| 3,623,039 | 11/1971 | Barham | 360/48 |
| 3,671,683 | 6/1972 | Rahenkamp et al. | 179/100.1 DR |
| 3,760,124 | 9/1973 | Gaven | 179/100.1 DR |
| 3,797,037 | 3/1974 | Kolpek | 360/72 |
| 3,800,313 | 3/1974 | Karklys | 360/69 |
| 3,827,079 | 7/1974 | Bolick | 360/79 |
| 3,829,898 | 8/9174 | Jager | 360/137 |
| 3,881,072 | 4/1975 | Becker | 179/100.1 DR |
| 4,007,491 | 2/1977 | Bolick et al. | 179/100.1 DR |

OTHER PUBLICATIONS

"Electronic . . . Fortune", Popular Electronics, Oct. 1975, pp. 69-70.

Electronics Circuit Manual, McGraw Hill Inc., 1971, pp. 170, 166.

"Digital . . . Indicator", Amateur Radio 73, Nov. 1968, pp. 40-42.

"Intregrated . . . Counter", Amateur Radio 73, Nov. 1968, pp. 20-27.

"Latch . . . Electrically", Electronics, Jan. 1975, Jack Elias.

Modern Control Engineering, Ogata, Prentice-Hall, 1970, p. 625.

*Primary Examiner*—Robert S. Tupper
*Attorney, Agent, or Firm*—Curtis, Morris & Safford

[57] ABSTRACT

Apparatus for indicating the location of particular information, such as instructions, represented by predetermined signals previously recorded on a record medium. An array of light emitting sources is selectively energized to indicate the position of the particular information relative to the length of the record medium while the array is scanned in synchronism with the scanning of the record medium to detect the presence of such predetermined signals. Indexing means sequentially conditions each of the light emitting sources to be energized during scanning; and a temporary storage circuit stores a representation of a detected predetermined signal, until a light emitting source is conditioned.

19 Claims, 3 Drawing Figures

+B
200
208
138
132
180
182
184
190
196
202
204
206
210
212
214
216
218
220
222
224
226
228
230
232
234
236
238
240
242
244
246
248

INSTRUCTION INDICATING APPARATUS FOR A RECORD AND/OR PLAYBACK DEVICE

Matter enclosed in heavy brackets [ ] appears in the original patent but forms no part of this reissue specification; matter printed in italics indicates the additions made by reissue.

*This is a continuation of application Ser. No. 79,171, filed Sept. 26, 1979, now abandoned which is an application to reissue U.S. Pat. No. 4,051,540 which, in turn, issued from U.S. application Ser. No. 678,697, filed Apr. 20, 1976.*

BACKGROUND OF THE INVENTION

This invention relates to recording and/or playback apparatus and, more particularly, to apparatus for indicating the location of particular information which is recorded on the record medium used in such recording and/or playback apparatus.

In the use of recording/playback devices for dictation purposes, an operator often desires to indicate the location of various instructions along the record medium. Typical of such instructions are inserts, deletions, the end of a selected piece of dictation, and the like. In some dictation apparatus, such indications are provided by physically marking the record medium, as by an ink or crayon mark, by a perforation, etc. These indications apprise a transcriptionist of the locations of such special instructions and are helpful in organizing and carrying out the transcription of recorded information.

It has been found that the physical marking of the record medium is not a fully satisfactory method of indicating the location of instructions. Accordingly, the prior art has developed improved indicating mechanisms which scribe marks on an indicating slip usually incorporated into the dictation apparatus. Typically, the slip is an index scale graduated in minutes and marked by, for example, a pencil or the like, by the operator. In many dictation devices, automatic marking devices also have been incorporated into the apparatus. Accordingly, the operator merely need actuate suitable controls on the apparatus to effect a corresponding mark on the index scale.

Although the marked index scale provides a generally adequate indication to a transcriptionist of the relative location of instructions on the record medium, there is the possibility that the marked index scale will be lost or otherwise separated from the record medium. This means that the transcriptionist cannot be apprised of such instructions at the outset of a transcribing operation, thereby contributing to possible confusion, erroneous transcription of dictated information or inordinate delay in completing the transcription.

In an attempt to overcome this problem attending separate, marked index scales, it has been proposed to record predetermined instruction signals on the record medium, these predetermined signals performing substantially the same function as the markings on the index scale. For example, the predetermined instruction signals can be recorded as tone signals which are not audibly sensed during playback. In preparation of a transcribing operation, the record medium is rapidly scanned to detect the presence of these tone signals and to mark an index strip which is scanned in synchronism with the scanning of the record medium when each such signal is detected. One example of such an instruction indicator apparatus is described in U.S. Pat. No. 3,040,135. Various types of marking mechanisms and index strips can be used, and one system proposes a thermosensitive index scale.

Although the technique of recording instruction signals substantially avoids the problem of lost index slips, it is necessary to provide a fresh index slip for each change in the record medium. For example, if the record medium is a magnetic belt, the scanning of that belt will mark one index slip, and the next belt which is transcribed requires the preparation of another index slip. Similarly, if the record medium is magnetic tape, such as a tape cassette, each new cassette requires the preparation of an associated index slip. Hence, index slips must be kept in ready supply.

OBJECTS OF THE INVENTION

Therefore, it is an object of the present invention to provide improved indicating apparatus for indicating the location of particular information on a record medium which overcomes the aforenoted problems.

Another object of this invention is to provide an instruction indicator system for use in dictation apparatus which avoids the problem of preparing a fresh index slip for each medium to be transcribed.

A further object of this invention is to provide improved instruction indicator apparatus for use in dictation apparatus wherein a single index medium is used repeatedly, this same index medium being electrically marked and cleared for each record medium to be transcribed.

A still further object of this invention is to provide improved instruction indicator apparatus for dictation apparatus wherein the relative locations of instructions on a record medium are indicated by selectively energized sources of light.

An additional object of this invention is to provide an improved instruction indicator system for dictation apparatus wherein a linear array of light sources is scanned in synchronism with the scanning of a record medium to energize a corresponding light source when a recorded instruction signal is detected.

Another object of this invention is to provide an improved scanning mechanism for an instruction indicator system to be used in dictation apparatus.

Various other objects, advantages and features of the present invention will become apparent from the ensuing detailed description, and the novel features will be particularly pointed out in the appended claims.

SUMMARY OF THE INVENTION

In accordance with the present invention, apparatus for indicating the location of particular information on a previously recorded record medium is provided, including a scanning mechanism for scanning the record medium to detect predetermined signals indicative of such particular information; an array of selectively actuable light emitting sources, indexing means for scanning the array of light emitting sources in synchronism with the scanning of the record medium; and a temporary storage device for temporarily storing a representation of a predetermined signal until the indexing means is in actuating relation with a light emitting source to energize that source.

BRIEF DESCRIPTION OF THE DRAWINGS

The following detailed description, given by way of example, will best be understood when read in conjunction with the accompanying drawings in which.

DETAILED DESCRIPTION OF A PREFERRED EMBODIMENT

Figure 1:
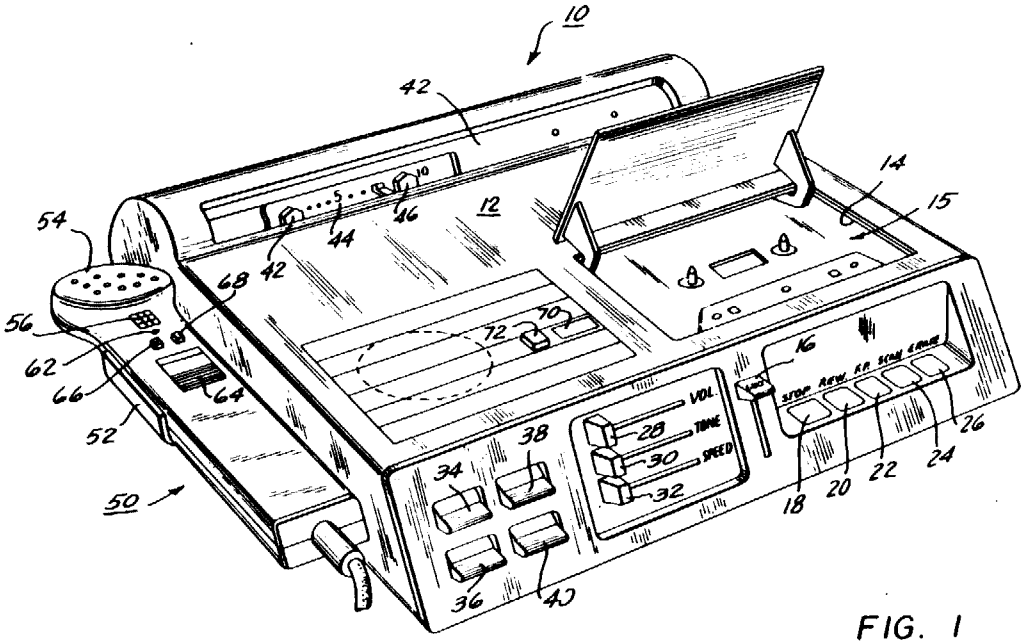
FIG. 1 is a perspective view of dictation apparatus in which the present invention finds ready application.

Referring now to the drawings, wherein like reference numerals are used throughout, and in particular to FIG. 1, there is illustrated a preferred embodiment of recording and/or playback apparatus 10, which can be used for the purpose of dictation and/or transcription, and a housing 12 upon which the various mechanical elements and electronic circuitry are supported. FIG. 1 also shows various operator-actuated elements, or control switching devices, to effect dictation and/or playback opertions. The record medium for the illustrated dictation/transcribing apparatus is magnetic tape of the type which is self-contained in a cassette housing 15. Such a magnetic tape cassette is conventional and is comprised of a supply reel and a take-up reel. The cassette housing is provided with various apertures to accommodate reel drive spindles to drivingly engage the supply and take-up reels, and to accommodate a record/playback transducer, or head, which is inserted into contact with the tape. As is conventional, additional apertures are provided to receive an erase head and a pressure roller, the latter cooperating with a capstan for moving the tape past the various heads. In order to accommodate such a tape cassette, dictation/transcribing apparatus 10 is provided with a cassette holder compartment 14 including a cassette support platform, various cassette guide mechanisms and a door to the compartment which when closed shields the cassette and the machine elements during operation. Although the illustrated dictation/transcribing apparatus 10 is particularly adapted to operate in conjunction with a tape cassette, it should be appreciated that other types of record media, such as belts, discs, and the like, can be used with the present invention.

Typical of the operator-controlled elements is an eject control 16 which, when actuated, serves to lift the door to cassette holder compartment 14, and to eject cassette 15 for removal from the apparatus. A series of control elements or switches, such as push-buttons or touch-sensitive devices, is provided for an operator to selectively control various machine operations. For example, a stop control 18 is provided to terminate the operation of dictation/transcribing apparatus 10 and to place the apparatus in a quiescent mode. When stop control 18 is actuated, tape movement is arrested, the record/playback head is withdrawn from tape contact and dictation/transcribing apparatus 10 is ready for subsequent placement in another operating mode.

The series of control elements also includes a rewind control 20 for rewinding the tape from its take-up reel within the cassette housing to its supply reel, as well as a fast-forward control 22 to rapidly move the tape from its supply reel to its take-up reel. In addition, a scan control 24 electronically scans the moving tape for the presence of predetermined control signals thereon. These control signals represent various instructions which are useful in guiding a transcriptionist during a transcribe operation. Hence, when actuated, the scan control 24 causes appropriate control apparatus to detect and indicate the relative locations of such control signals, as will be described in greater detail hereinbelow.

An erase control 26 is provided for erasing information previously recorded on the magnetic tape.

Another series of operator-actuated controls is provided to enable an operator to selectively control the audio characteristics of reproduced information. To this effect, a volume control 28, a tone control 30 and a tape-speed control 32 are provided to perform the respective indicated functions.

Yet another series of operator-actuated controls is provided, including an on/off switch 34, a speaker control switch 36 and a conference/dictate switch 38. The illustrated dictation/transcribing apparatus 10 is provided with a loudspeaker; and, additionally, a microphone assembly 50 which is used with the apparatus for dictation is also provided with a loudspeaker. Accordingly, speaker control switch 36 permits an operator to selectively actuate the loudspeaker of the dictation apparatus or the loudspeaker of the microphone assembly for the reproduction of sound, as desired. Conference/dictate control switch 38 is provided to selectively enable an operator of the dictation apparatus to use the apparatus to record a conference. In the conference mode, the amplification gain of the recording circuits is increased.

An optional telephone control switch 40 is provided to selectively enable an operator to use the dictation apparatus to record information directly from a telephone line.

Control indicators 42 are provided at the rear of dictation/transcribing apparatus 10 and include various indicators, such as light sources, for apprising an operator of the condition of the machine. Positioned adjacent control indicators 42 is a slide index 44 including a scale and a movable slide lever 46 which traverses the scale. Slide lever 46 moves in synchronism with the movement of the cassette tape so as to indicate to the operator his present position in respect to the full length of the tape. Instruction indicators are juxtaposed slide index 44, the instruction indicators being selectively energized during a tape scanning operation. These indicators, and their operation, are described more fully below with reference to FIG. 2.

Microphone assembly 50 is electrically connected to the control electronics included in apparatus 10. For convenience, microphone assembly 50 is supported on a microphone support bracket 52 which may be coupled to the machine housing 12. Microphone assembly 50 includes a sound transducer 54 for converting audio information into corresponding electrical signals, and a loudspeaker 56, described above. In addition, various operator-controlled actuating elements 58, 60, 62, 64, 66 and 68 are provided to enable an operator to control a dictation operation merely by the selective operation of the indicated elements. These elements include a dictate control switch which, when actuated, energizes corresponding components in apparatus 10 to permit information to be recorded on the magnetic tape; a rewind control switch for high speed rewind of tape; a dictate indicator to apprise an operator of the operating mode in which apparatus 10 is conditioned; a forward/stop control switch to transport tape from the supply reel to the take-up reel; and a fast-forward switch for the fast forward movement of tape. In addition, one or more instruction switches are provided, and these switches, when actuated, place predetermined control signals on the tape, indicating that succeeding information is intended to be an instruction, or that the end of a selected piece of dictation has been reached. It is these control signals which are detected in response to the actuation of the scan control 24.

As shown in FIG. 1, dictation/transcribing apparatus 10 is provided with a tape footage counter 70, which may be a conventional digital counter representing the amount of tape which has been transported, and a reset control 72 adapted to reset the count displayed by the counter 70 to a reference, or zero, indication.

The functions of the aforementioned operator-control elements are self-evident. Accordingly, in the interest of brevity, further description thereof is not provided.

Although particularly adapted for a dictation operation, apparatus 10 also is fully capable of performing a transcribing operation. For this purpose, a foot switch (not shown) and, optionally, headphones are provided. Actuation of the foot switch advances the tape in cassette 15 either in a playback mode, a rewind mode or a fast-forward mode. If desired, when used as a transcribing device, controls necessary for recording information on the tape are omitted.

Figure 2:
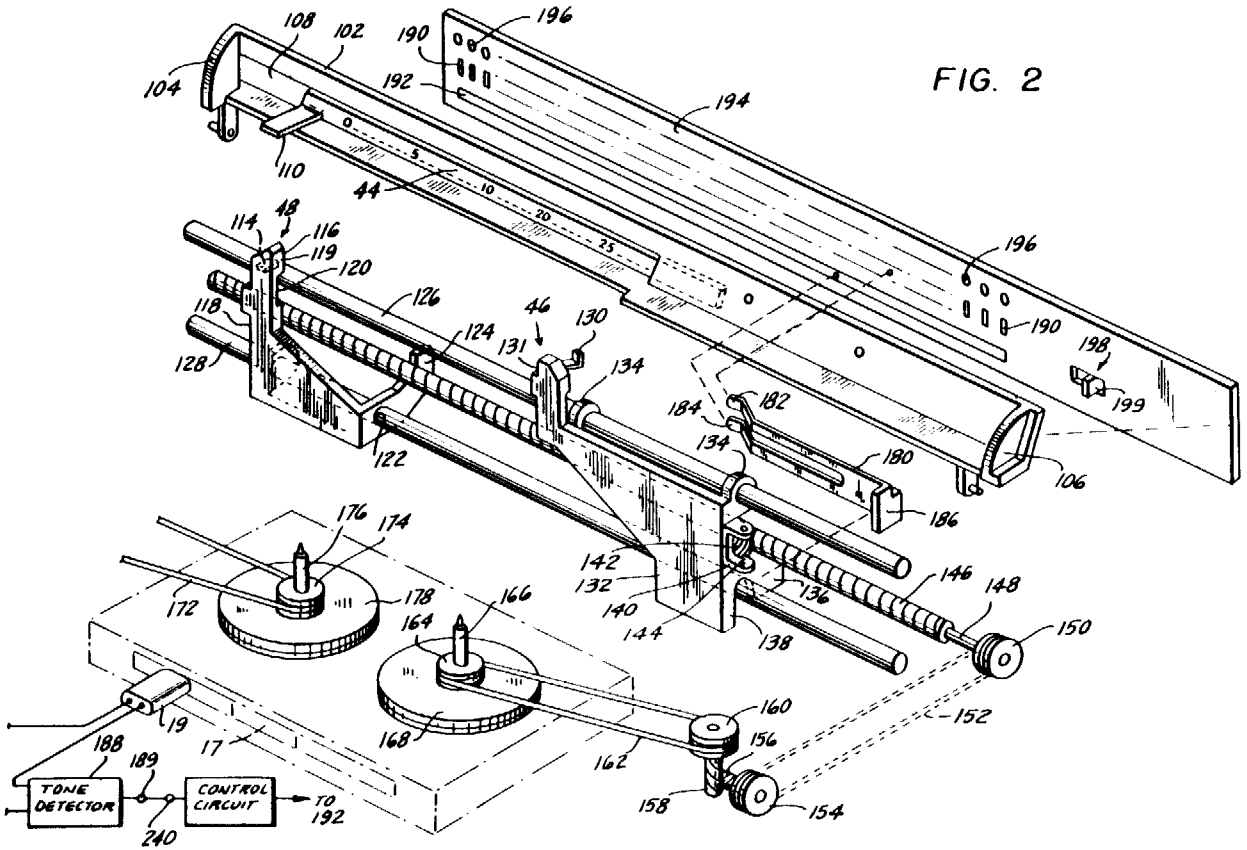
FIG. 2 is a perspective view of portions of the instruction indicating apparatus used in the dictation apparatus of FIG. 1 and which includes the present invention.

The instruction indicator apparatus which can be used with dictation/transcribing apparatus 10 now will be described with reference to FIG. 2. Slide index 44 is seen to have time indications inscribed or printed thereon and adapted to be slidable in a frame 102. Frame 102 includes side members 104 and 106 and is positioned in the rear of dictation/transcribing apparatus 10. A window 108 in frame 102 permits an operator to view strip 44.

A projection 110 from index strip 44 extends outwardly of the frame 102, as shown, and is adapted to engage a notch 114 in an upstanding portion 48 of arm 116 fixed to a carriage 118. Carriage 118 is slidable on a pair of guide rails 126, 128 and includes a guide 120 supported on rail 126, a body portion having a bore 122 for rail 128 and the upstanding portion 48 which is used as a reference for index scale 44. A leg 124 extends rearwardly of carriage 118 which is substantially L-shaped when viewed from above. Guide rails 126 and 128 extend the length of frame 102 and are supported in housing 12 of dictation/transcribing apparatus 10.

Another carriage 132 is provided with support guides 134 and 138 to slidably support the carriage on rails 126 and 128. An indicator portion 130, corresponding to movable slide lever 46 (shown in FIG. 1) extends upwardly from carriage 132 and is adapted to traverse index scale 44 and a leg 136 extends rearwardly of the carriage. Carriage 132 is drivingly coupled to a lead screw 146 by a worm gear 142 mounted in a bracket 140 secured to the carriage. As shown, bracket 140 includes upper and lower support members to receive worm gear 142 and a spring 144 to bias the worm gear toward lead screw 146 so as to develop sufficient friction therebetween, whereby the worm gear and bracket 140 are driven when lead screw 146 is rotated. However, this friction is overcome when, for example, a manual force is exerted on carriage 132 to slide this carriage in either direction along guide rails 126 and 128. When slid in response to this manual force, worm gear 142 rotates to permit the substantially free movement of carriage 132 with respect to lead screw 146.

Opposing faces 119 and 131 of portion 48 on carriage 118 and indicator 130, respectively, are adapted to abut against each other. When lead screw 146 is driven to drive carriage 132 from right to left, carriage 118 thus can be pushed along guide rails 126 and 128 by carriage 132. When carriage 132 moves in the opposite direction, for example, when lead screw 146 is oppositely driven, carriage 118 remains in the farthest position to which it was pushed and faces 119 and 131 separate. If carriage 118 is manually pushed form left to right, portion 48 pushes indicator 130, and carriage 118 drives carriage 132 along guide rails 126 and 128.

An L-shaped wiper 180, formed of electrically conductive material, such as copper, is secured to rearwardly extending leg 136 of carriage 132 by element 186. Wiper 180 is a bifurcated element having wiper contacts 182 and 184.

The instruction indicator apparatus includes a linear array of selectively energizable light emitting sources 196. These light sources are mounted on an insulated support 194 which may be secured to and supported by frame 102. Alternatively, insulated support 194 is suitably mounted and supported in the rear portion of housing 12 of dictation/transcribing apparatus 10. Each light source 196 is electrically coupled to a contact, or conductive land 190, mounted on insulated support 194, as will be described below with respect to FIG. 3. Preferably, each land 190 is in vertical alignment with its associated light source 196.

A contact strip 192 is mounted on insulated support 194 and extends longitudinally of the support. In FIG. 2, contact strip 192 is positioned beneath the respective lands 190; and in an alternative embodiment, contact strip 192 is positioned above lands 190. The relative positioning of lands 190 and strip 192 enables wiper contacts 182 and 184 to traverse simultaneously lands 190 and strip 192, respectively. As wiper 180 is driven by carriage 132, wiper contact 184 is in continuous contact with strip 192, while wiper contact 182 sequentially contacts successive lands 190.

A switch 198, including a switch actuator 199 contacted by leg 136 extending rearwardly of carriage 132, is supported on insulated support 194. As will be described in greater detail hereinbelow, the abutment of leg 124 against switch actuator 199 opens switch 198.

In a preferred embodiment, strip 192 is supplied with actuating signals produced when predetermined tones recorded on magnetic tape 17 in cassette 15 are detected. These predetermined tones are recorded by an operator during a dictation operation to represent the locations of particular instructions, as discussed above. The circuitry used for recording such predetermined tones is known and forms no part of the present invention per se. During an instruction-scanning operation, these recorded tones are picked up by a suitable playback head 19 and are detected by a tone detector 188 electrically coupled to head 19. Tone detector 188 may be of conventional construction and produces an actuating signal at its output terminal 189 in response to each tone signal detected during the instruction-scanning operation. Output terminal 189 is, in turn, coupled to an input terminal 240 of a control circuit 200 which supplies the actuating signal to strip 192 for the selective energization of a light source 196, as will be described.

The scanning of lands 190 by wiper 180 is performed when carriage 132 is driven in synchronism with the electronic scanning of tape 17 in cassette 15. This synchronism is achieved by driving lead screw 146 concurrently with the tape spools within the cassette 15. To this effect, a drive shaft 148 of lead screw 146 is coupled to a drive pulley 150 having a drive belt 152 coupled to a pulley 154 having a gear 156 associated therewith disposed in meshing engagement with a gear 158 coupled to a drive pulley 160. Drive pulley 160 is coupled by a drive belt 162 to a take-up pulley 164 mounted so as to be rotated with take-up spindle 166 insertable in a suitable cassette aperture, and take-up reel support member 168. Of similar construction is a supply pulley 174 coupled to a supply spindle 176 and a supply reel support member 178 for simultaneous rotation. In addition, a drive belt 172 couples supply pulley 174 to further apparatus (not shown). Supply spindle 176 is also insertable through an aperture into the supply reel hub of cassette 15.

The tape transport mechanism included in dictation/-transcribing apparatus 10 for selectively driving the supply and take-up reels of cassette 15 in forward, fast-forward and rewind direction is described in greater detail in copending application Ser. No. 678,596, filed Apr. 20, 1976. Suffice it to say that when the take-up reel is rotated, take-up pulley 164 is correspondingly rotated to thereby drive lead screw 146 in synchronism with the movement of tape 17 in cassette 15.

An instruction-scanning operation now will be described in greater detail. After dictating information onto tape 17 in cassette 15, including the recording of instruction tone signals, cassette 15 is ready for transcription. Preferably, tape 17 is not rewound at the conclusion of a dictation operation. Accordingly, when cassette 15 is disposed in dictation/transcribing apparatus 10 for a transcribing operation with tape 17 disposed in its farthest position reached during the dictation operation, actuation of scan control 24 rewinds tape 17 past playback head 19. In one embodiment, playback head 19 is separate from the normal playback head used to reproduce radio information during the transcribing operation.

As tape 17 is rapidly rewound, lead screw 146 is driven to slide carriage 132 and, thus carriage 118 from their initial right-most position along guide rails 126 and 128. Hence, leg 136 extending from carriage 132 moves away from switch actuator 199 to close switch 198. As the carriages slide along guide rails 126 and 128, index scale 44 slides into view in window 108 of frame 102 and wiper 180 scans successive lands 190. When a predetermined tone is picked up from tape 17 by head 19 and detected by tone detector 188, an actuating signal is supplied to control circuit 200. As soon as wiper contact 182 arrives in electrical contact with a land 190, this actuating signal is transmitted from strip 192, through wiper 180 to the contacted land 190 to energize an associated light source 196.

This scanning operation continues until tape 17 has been fully rewound onto its supply reel in cassette 15, carriages 118 and 132 have reached their left-most positions corresponding to the amount of tape to be transcribed, and the tape transport mechanism is deactuated. In this condition, the portion of index scale 44 viewable through window 108 in frame 102 represents the amount of information dictated onto tape 17 which is to be transcribed (which, of course, may be any amount equal to or less than the total length of tape) and indicator 130 is at the zero reference mark on index scale 44, corresponding to the initial or zero reference position on tape 17 from which transcription now proceeds. The energization of selective ones of light sources 196 indicate to the transcriptionist the relative locations along the length of tape 17 at which particular instructions are provided. Accordingly, the entire transcribing operation can be planned in advance by the transcriptionist, thus facilitating and expediting efficient transcription.

As transcription proceeds, tape 17 is transported from its supply reel to its take-up reel by the tape transport mechanism which also drives lead screw 146 in its opposite direction. Carriage 132 now is driven from left to right and indicator 130 traverses index scale 44 to indicate to the transcriber that portion of tape relative to its entire length which then is being transcribed. Carriage 132 continues to be driven in the righthand direction until the completion of the transcribing operation at which time the carriage will return to its initial right-most position. A suitable stop is provided on frame 102 to prevent further movement of carriage 132 when it has reached its right-most position.

While carriage 132 is driven in the left-to-right direction by lead screw 146, carriage 118 remains stationary at its left-most position. At the conclusion of the transcribing operation, the transcriptionist slides carriage 118 in the left-to-right direction to retract index scale 44. When carriage 118 reaches its right-most position, determined by the abutment of portion 48 against indicator 130, leg 124 contacts switch actuator 199 to open switch 198, thereby resetting, or de-energizing, all of the light sources 196. Hence, the instruction indicator apparatus is ready for a subsequent scanning and transcribing operation.

During the transcribing operation, tone detector 188 does not detect the predetermined instruction tone signals which have been recorded on tape 17. In one embodiment, head 19 and/or tone detector 188 operate only during the scanning operation and are de-energized during the transcribing operation, thereby making these elements insensitive to such recorded tone signals. In an alternative embodiment, tone detector 188 is provided with a filter circuit whose frequency range is higher than the frequency of the predetermined tone signals which are reproduced during transcription. Since tape 17 is transported at a higher speed during scanning than during transcribing (i.e. playback), the frequency of these tone signals reproduced during a scanning operation is much higher than when reproduced during a transcribing operation. For example, if the predetermined tone signal is recorded as a 60 Hz signal, and if the tape speed during a scanning operation is 10 times the tape speed during a transcribing operation, then this 60 Hz signal is reproduced as a 600 Hz signal during scanning. If tone detector 188 includes a high-pass filter circuit, the 600 Hz tone is detected during the scanning operation but the 60 Hz tone reproduced during a transcribing operation is not detected.

Carriages 118 and 132 can be returned to their beginning, or right-most position, at any time merely by manually sliding carriage 118 in the left-to-right direction. In general, this is done by an operator (transcriptionist) of dictation/transcribing apparatus 10 after the completion of one transcribing operation and in preparation of another. This movement of carriage 118 retracts index scale 44 to its initial position which is not viewable through window 108 and, additionally, moves carriage 132 in the right-hand direction. The driving force exerted on carriage 132 is sufficient to overcome the frictional force between worm gear 142 and lead screw 146, thereby permitting worm gear 142 to rotate as carriage 132 slides along guide rails 126 and 128. Movement of these carriages continues until they reach the rightmost or initial, position.

Carriages 118 and 132 can be manually located at their left-most position by an operator (dictator) in preparation for each dictating operation. This fully withdraws index scale 44 which is scanned by indicator 130 as dictation proceeds.

One embodiment of control circuit 200 now will be described with reference to FIG. 3. Preferably, light sources 196 are comprised of light emitting diodes (LED's); although alternative light source or light reflective elements, such as incandescent lamps, electroluminescent devices, liquid crystals and the like, can be used. The term "light emitting element", as used herein and in the claims, shall be interpreted as including all such light source or light reflective elements. Each LED 196 is connected in series with a switch element 204 such as a silicon controlled rectifier (SCR), a transistor device, or the like, so as to be energized when the switch element is actuated, or turned on. The series combinations of LED and SCR are connected in parallel through the previously described switch 198 to a source of DC voltage +V. Each series circuit also includes a current limiting resistor 202. As is conventional, a gate resistor 206 is connected between the gate and cathode electrodes of each SCR 204, and the gate electrode is further connected to an input terminal constituted by an associated contact land 190.

Figure 3:
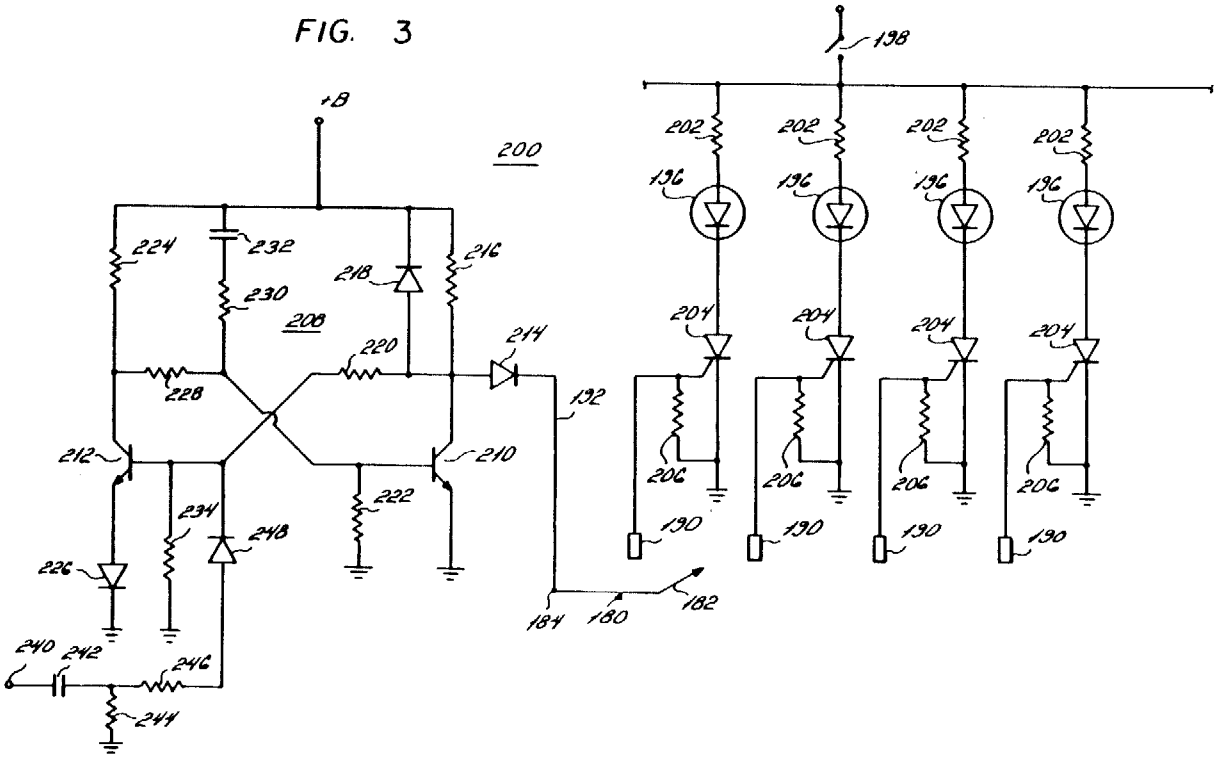
FIG. 3 is a schematic diagram of the electronic circuitry included in the instruction indicating apparatus of the present invention.

FIG. 3 diagrammatically represents that wiper 180 has its wiper contact 182 adapted to selectively contact each of lands 190, and its wiper contact 184 connected to contact strip 192. Contact strip 192 is electrically connected through a diode 214 to a bistable, or flip-flop, circuit 208 formed of cross-coupled transistors 210 and 212. The collector electrode of transistor 210 is coupled to the base electrode of transistor 212 by a resistor 220 and the collector electrode of transistor 212 is coupled to the base electrode of transistor 210 by a resistor 228. Resistors 222 and 234 are connected between the base electrodes of the respective transistors 210 and 222 and a reference potential, such as ground. Collector resistors 216 and 224 are connected between the collector electrodes of the respective transistors 210 and 212 to a DC power supply source +B. The emitter electrode of transistor 210 is connected directly to ground and the emitter electrode of transistor 212 is connected to ground by a diode 226.

A reset circuit comprised of series-connected resistor 230 and capacitor 232 is connected between the base electrode of transistor 210 and the power supply +B. This reset circuit functions to reset the flip-flop circuit 208 when power first is applied thereto. That is, when power first is turned on, a positive pulse is applied through the capacitor 232 to the base electrode of transistor 210 to render this transistor conductive, i.e., to turn it on. This, in turn, maintains transistor 212 nonconductive whereby flip-flop circuit 208 is in its reset state to apply a relatively low voltage from the collector electrode of transistor 210 through diode 214 to the contact strip 192 and to wiper 180.

A trigger circuit comprised of a capacitor 242, resistors 244 and 246 and a diode 248 is connected between the input terminal 240 of control circuit 200 and the base electrode of transistor 212. Capacitor 242 and resistor 244 function as a differentiating circuit to produce a trigger pulse when an actuating signal is applied to input terminal 240 by tone detector 188. This trigger pulse drives transistor 212 to its conducting state, thereby turning transistor 210 off. Accordingly, flip-flop circuit 208 is triggered into its set state to apply a relatively higher voltage from the collector electrode of transistor 210, through diode 214 to contact strip 192 and wiper 180. When wiper contact 182 is in contact with a land 190, the associated SCR 204 is triggered by this higher voltage to provide a conducting path from the DC voltage source +V, through closed switch 198, and then through current limiting resistor 202, LED 196 and the triggered SCR 204 to ground. Current flowing through this path energizes LED 196 to provide an indication of the location of the instruction signal relative to the length of tape.

The electrical contact between wiper contact 182 and a land 190 establishes a conducting path to ground from the collector electrode of transistor 210, through diode 214 to contact strip 192 and wiper 180, and then through land 190 and gate resistor 206. This conducting path decreases the voltage at the collector electrode of transistor 210 below that necessary to maintain the conductivity of transistor 212. Consequently, flip-flop circuit 208 is reset when wiper contact 182 contacts a land 190.

When wiper contact 182 is removed from a land 190, the SCR remains actuated to maintain the conducting path from the DC voltage source +V, through the closed switch 198, current limiting resistor 202, LED 196 and actuated SCR 204 to ground. Hence, LED 196 remains energized. It is an advantageous feature of the present invention that, because SCR's 204 are not supplied with deactuating signals. LED's 196 are not deenergized until switch 198 is opened to clear, or reset, all of the LED's which has been energized.

In accordance with another advantageous feature of the present invention, if an actuating signal is applied to input terminal 240 by tone detector 188 at a time that wiper contact 182 is not in electrical contact with a land 190, the actuating signal is temporarily stored in flip-flop circuit 208 until wiper 108 is sufficiently advanced to position wiper contact 182 in electrical contact with a land 190. That is, flip-flop circuit 208 remains in its set state until wiper contact 182 contacts a land 190 to energize an LED 196 and reset the flip-flop circuit as described above. Therefore, although instruction tone signals can be recorded at any random location along the length of tape 17, the possibility that the tone signal will be detected at a time that wiper 180 is not in actuating relation with a land 190 will not result in a failure to indicate the relative location of this instruction signal.

Hence, flip-flop circuit 208 insures that an LED 196 will be energized even if an actuating signal is produced by tone detector 188 at a time that wiper contact 182 is not in contact with land 190, as when the contact leaves one land but has not reached the next land. Flip-flop circuit 208 also obviates false actuation of LED's which may otherwise be caused by contact "bounce" between wiper contact 182 and a land 190.

In accordance with yet another feature of the present invention, the DC voltage source +V and the DC power supply source +B preferably are different circuits. For example, the operating voltage supplied by the DC source +V is derived directly form the line voltage supplied to dictation/transcribing apparatus 10 and by-passes on/off switch 34 (FIG. 1); whereas the voltage supplied by the DC power supply +B is a regulated voltage and is terminated when on/off switch 34 is opened. Accordingly, if, prior to the completion of a transcribing operation, dictation/transcribing apparatus 10 is turned off, for example, the transcriptionist temporarily leaves the machine, the selectively energized LED array nevertheless will remain energized. This enables the transcriptionist who turned the apparatus off to observe instruction indications for the remaining information to be transcribed. The instruction indicator display is cleared by opening switch 198, as aforedescribed, or by interrupting the input line voltage supplied to the apparatus.

While the present invention has been particularly shown and described with reference to a preferred embodiment thereof, it will be readily apparent to one of ordinary skill in the art that various changes and modifications in form and details can be made without departing from the spirit and scope of the invention. For example, worm gear 142 mounted on carriage 132 can be replaced by other gear-follower devices or other follower means for permitting carriage 132 to be driven by lead screw 146, yet enabling the carriage to slide along the lead screw when a force is exerted thereon. As another example of a further modification of the illustrated apparatus, contact strip 192 may be omitted if wiper 180 is electrically coupled to flip-flop circuit 208 by alternative means. For instance, guide rail 126 or 128 may be formed of conductive material and flip-flop circuit 208 and wiper 180 may be in electrical contact with the guide rail. Furthermore, although light sources are selectively energized when tape 17 is scanned in a rewind direction, it should be apparent that the light sources can be energized when tape 17 is scanned in a fast-forward direction.

Therefore, it is intended that the appended claims be interpreted as including the foregoing as well as various other changes and modifications.

What is claimed is:

1. Apparatus for indicating the location of particular information on a previously recorded record medium, said particular information being represented by predetermined recorded signals, comprising:

scanning means for scanning said record medium;

an array of selectively actuable light emitting sources;

indexing means for scanning said array of light emitting sources in synchronism with the scanning of said record medium, said indexing means being in actuating relation sequentially with each of said light emitting sources;

detecting means for detecting the presence of said predetermined recorded signals during the scanning of said record medium to produce an actuating signal; and temporary storage means for temporarily storing said actuating signal until said indexing means is in actuating relation with an unenergized light emitting source to energize said light emitting source.

2. Apparatus as defined in claim 1 wherein said indexing means comprises plural terminals each associated with a corresponding light emitting source; and actuating means for applying said actuating signal to a terminal when in actuating relation with said light emitting source associated therewith.

3. Apparatus as defined in claim 2 wherein said terminals and light emitting sources are arranged in a linear array.

4. Apparatus as defined in claim 3 wherein said actuating means comprises a wiper element movable to electrically contact each said terminal in sequence; and plural switch means each coupled to an associated terminal and actuable in response to said actuating signal applied by said wiper element to energize a light emitting source.

5. Apparatus as defined in claim 4 wherein each switch means comprises a silicon controlled rectifier.

6. Apparatus as defined in claim 4 wherein each light emitting source comprises a light emitting diode.

7. Apparatus as defined in claim 4 wherein said indexing means further comprises a carriage upon which said wiper element is mounted; and means for driving said carriage past said linear array of terminals in synchronism with the scanning of said medium.

8. Apparatus as defined in claim 7 wherein said driving means comprises a lead screw driven by said scaning means; and follower means coupled to said carriage and in engagement with said lead screw to move said carriage as said lead screw is driven.

9. Apparatus as defined in claim 8 wherein said follower means comprises a gear in meshing engagement with said lead screw; a mounting support on said carriage for rotatably mounting said gear thereto; and a spring member for biasing said gear toward said lead screw, whereby the frictional forces exerted on said gear prevent said gear from rotating when said lead screw is driven, said frictional forces being overcome by a force exerted on said carriage to slide said carriage longitudinally of said lead screw.

10. Apparatus as defined in claim 8 wherein said indexing means further comprises a slidable carriage driven by the first carriage when said lead screw is driven; an index scale coupled to said slidable carriage and movable therewith; and reset means actuable by one of said first and slidable carriages when said carriages are moved to a predetermined position relative to said lead screw for de-energizing said light emitting sources.

11. Apparatus as defined in claim 4 wherein said temporary storage means comprises bistable means for receiving said actuating signal, said bistable means being settable to a first stable state when said actuating signal is received and to a second stable state when a switch means is actuated.

12. Apparatus as defined in claim 11 wherein said bistable means comprises first and second cross-coupled transistor means, an output terminal of each transistor means being coupled to an input terminal of the other transistor means; the output terminal of said first transistor means being coupled to said wiper element; and the input terminal of said second transistor means being coupled to said detecting means for receiving said actuating signal.

13. Apparatus as defined in claim 12 wherein said bistable means further comprises means for applying a DC operating voltage thereto; and means coupled to the input terminal of said first transistor means for setting said bistable means to said second stable state when said DC operating voltage is initially applied.

*14. Apparatus for indicating the location of particular information on a previously recorded record medium, said particular information being represented by predetermined recorded signals, comprising:*

*scanning means for scanning said record medium;*

*an array of selectively actuable light emitting sources;*

*means for scanning said array of light emitting sources in synchronism with the scanning of said record medium;*

*detecting means for detecting the presence of said predetermined recorded signals during the scanning of said record medium to produce an actuating signal;*

*storage means for storing said actuating signal; and*

*energizing means for energizing a respective light emitting source, commensurate with the location of the record medium being scanned, with the stored actuating signal to provide, upon scanning the record medium, a display of the relative locations of said predetermined recorded signals on said record medium.*

*15. The apparatus of claim 14 wherein said means for scanning said array of light emitting sources comprises index means for indexing successive light emitting sources, one-at-a-time, to enable the energization of the light emitting source then being indexed at the time that the predetermined recorded signal is detected.*

*16. In dictation/transcription apparatus, an electronic indicator for indicating the location of particular information recorded on a record tape, which information is represented by predetermined signals, wherein the record tape is scanned and the presence of a predetermined signal is detected during said scanning, comprising:*

*a linear array of fixed, selectively energizable light elements, each being selectively energized from an inactive condition to an active condition to provide a visual light mark representing its active condition;*

*means for scanning said linear array of light elements in synchronism with the scanning of said record tape;*

*detecting means for detecting the presence of a predetermined signal as said record tape is being scanned to produce an actuating signal;*

*storage means for storing said actuating signal; and*

*energizing means for energizing a respective light element, commensurate with the location of the record tape being scanned, with the stored actuating signal to provide, upon scanning the record tape, a display of the relative locations of said predetermined signals on said record tape.*

*17. The electronic indicator of claim 16 wherein said means for scanning said linear array of light elements comprises index means to index said light elements one-at-a-time to condition an indexed light element to be energized when a predetermined signal is detected.*

*18. Indicator apparatus for use in a dictation/transcription device to provide a visual indication of the relative locations on a record medium used with said device at which predetermined signals are recorded, said apparatus comprising:*

*an array of selectively energizable visual indicating elements;*

*energizing means for selectively energizing said visual indicating elements;*

*scanning means for scanning said record medium for occurrences of said predetermined signals;*

*detecting means operable with said scanning means for detecting the recorded predetermined signals as said record medium is scanned and for producing an actuating signal in response to a detected predetermined signal; and*

*means operable in synchronism with said scanning means, said means causing said energizing means to be activated, in accordance with the actuating signals when the record medium has been scanned, so as to provide a visual indication of the relative locations of said predetermined signals.*

*19. Electronic indicator apparatus for providing a visual indication of the relative locations on a record medium at which predetermined signals are recorded, comprising:*

*a linear array of visual indicating elements selectively energizable from an "off" condition to an "on" condition;*

*energizing means for selectively energizing the indicating elements from said "off" condition to said "on" condition;*

*scanning means for scanning said record medium for the occurrences thereon of said predetermined signals;*

*detecting means for detecting the predetermined signals and for producing actuating signals in response thereto;*

*storage means operable in synchronism with said scanning means for storing the actuating signals produced; and*

*means for activating the energizing means with each stored actuating signal so as to energize selected indicating elements and thereby provide, upon the completion of the scanning of said record medium, selected indicating elements in the "on" condition representing the relative locations on said record medium at which said predetermined signals are recorded.*

* * * * *